(12) United States Patent
Brown et al.

(10) Patent No.: US 11,540,573 B1
(45) Date of Patent: Jan. 3, 2023

(54) WAISTBAND CLIP

(71) Applicants: Lateshia L. Brown, Florissant, MO (US); Theodore W. Brown, Jr., Florissant, MO (US)

(72) Inventors: Lateshia L. Brown, Florissant, MO (US); Theodore W. Brown, Jr., Florissant, MO (US)

(*) Notice: Subject to any disclaimer, the term of this patent is extended or adjusted under 35 U.S.C. 154(b) by 129 days.

(21) Appl. No.: 17/168,730

(22) Filed: Feb. 5, 2021

(51) Int. Cl.
*A41F 9/02* (2006.01)
*F16B 2/10* (2006.01)

(52) U.S. Cl.
CPC .............. *A41F 9/025* (2013.01); *F16B 2/10* (2013.01)

(58) Field of Classification Search
CPC .. F16B 2/10; Y10T 24/1394; Y10T 24/44316; Y10T 24/44496; Y10T 24/44607; Y10T 24/45037; Y10T 24/44701; Y10T 24/44692; Y10T 24/44684; A41F 9/025
See application file for complete search history.

(56) References Cited

U.S. PATENT DOCUMENTS

| | | | |
|---|---|---|---|
| 2,849,733 A | | 9/1958 | Polis et al. |
| 4,164,044 A | | 8/1979 | Holmes |
| 4,716,634 A | * | 1/1988 | Fan .......................... D06F 55/00 223/91 |
| 5,349,724 A | * | 9/1994 | Bracco Barcina ..... B65D 5/069 24/537 |
| 6,484,374 B2 | * | 11/2002 | McAllister ............ F16B 5/0692 24/561 |
| 10,851,820 B2 | * | 12/2020 | Spearing ................ F16B 21/073 |
| 2003/0061688 A1 | * | 4/2003 | Rodriguez ................ B42F 1/00 24/537 |
| 2009/0260191 A1 | * | 10/2009 | Cornelison ............. A45F 5/021 24/3.12 |

FOREIGN PATENT DOCUMENTS

WO    9853716 A1    12/1998

OTHER PUBLICATIONS

Translation WO 98/53716, (dated Mar. 11, 2019).
A Novel Surface Texture Shape for Directional Friction Control, Tribology Letters (2018) 66:51.

* cited by examiner

Primary Examiner — Robert Sandy
(74) Attorney, Agent, or Firm — Grace J. Fishel

(57) ABSTRACT

A two-part clip for making a waistband smaller including a U-shaped cover and a U-shaped sinch. The cover has a top wall and opposing sidewalls, one of which has a T-shaped connector and the other of which has a protrusion. The sinch has a top wall and opposing sidewalls with oppositely directed longitudinal fins on the inboard side. A first of the sinch sidewalls has a slot for receipt of the T-shaped connector and the second of which has a sloped dome on the outboard side with a guideway for directing the protrusion on the cover into a well provided in the dome. The cover has an aperture in the top wall into which the top wall of the sinch is received with abutment ledges in the aperture received in detents in the top cover of the sinch as the cover is slid over the sinch.

15 Claims, 11 Drawing Sheets

WAISTBAND CLIP

BACKGROUND OF THE INVENTION

Field of the Invention

The present invention relates to a clip for making waistbands on skirts, pants, shorts, skorts, leggings, stockings and the like smaller in a manner that is attractive and without doing damage to the garment.

Brief Description of the Prior Art

A common problem with toddlers is that the waistband on many clothes is too big and the garment slips down. Buying a smaller size is not a solution as garments with smaller waistbands are too short or otherwise too small. The problem does not go away for teenagers and even older people with small waists.

For people who sew, the garment can be turned inside out and the waistband pinched equally on both sides. The pinched waist may be marked with tailor's chalk and stitched along the marked line. Another technique is turn the garment inside out and cut slits into the band on opposite sides of the back seam. A piece of elastic is then threaded into the waistband between the two slits and the ends stitched. But many people do not sew or have a sewing machine to effectively practice either of the above techniques. In addition, the adjustment permanently alters the garment and is difficult to reverse if the wearer grows.

When sewing is not an option, the most common "solution" is to fold over a section of the waistband on opposite side seams and secure each of the folds with a large safety pin. A safety pin may open during wearing and is a danger. In addition, a safety pin looks tacky. Commercially there are elastic members with double ended with clips that may be installed on the back of the waistband but the waistband does not bunch smoothly under the clip member such that the adjustment is obvious from the rear.

BRIEF SUMMARY OF THE INVENTION

In view of the above, it is an object of the present invention to provide a clip for adjusting the size of a waistband that requires no physical alteration of the garment. It is also an object to provide a clip that is easy to use and attractive. Other objects and features of the invention will be in part apparent and in part pointed out hereinafter.

In accordance with the invention, a clip for use in making a waistband smaller includes a u-shaped cover and a U-shaped sinch adapted to slide inside the U-shaped cover. In all embodiments the U-shaped cover has a cover top wall with an aperture and first and second opposing sidewalls. The first cover sidewall is hinged to the top wall and has a longitudinal T-connector and second cover sidewall has a protrusion. The U-shaped sinch has a top wall adapted to fit within the aperture in the cover top wall and first and second opposing sidewalls. The first sinch sidewall has a longitudinal slot adapted to slidingly receive the T-connector and a well on the outboard side of the second sinch sidewall to receive the protrusion.

In an embodiment the well is in a dome on the outboard side of the second sinch sidewall and is sloped downwardly toward the sinch top wall with a guideway for directing the protrusion into the well.

In other cases the T-connector flanked on an inboard side of the first sinch sidewall by longitudinal fins positioned in a first direction and the second sinch sidewall has longitudinal fins positioned in a second direction on an inboard side. In some instances the longitudinal fins on the first and second sinch sidewalls and the inboard side of the first and second sinch sidewalls are coated with an anti-slip coating.

For comfort of a wearer, cover top wall and the first cover sidewall are curved on an outboard side to fit against a waist of a user and the first cover sidewall is padded with felt or the like.

In other applications the aperture in the cover top wall has abutment ledges and the sinch top wall has detents adapted to receive the abutment ledges.

In another aspect, the first cover sidewall has L-shaped side ridges on an inboard side forming a first channel and the second cover sidewall has L-shaped side ridges on an inboard side forming a second channel for receipt of the sinch. In other cases, the fins on the first sinch sidewall are encased in sidewalls and footed with a bottom wall and wherein the fins on the second sinch sidewall are footed with a bottom wall with bottom wall on the first sinch sidewall opposing said bottom wall on the second sinch sidewall.

In still further embodiments, the first and second sidewalls of the sinch are longer than the first and second sidewalls of the cover such that the first and second sidewalls of the sinch may be pinched together by a user to release the sinch from the cover.

The invention summarized above comprises the constructions hereinafter described, the scope of the invention being indicated by the subjoined claims.

BRIEF DESCRIPTION OF THE SEVERAL VIEWS OF THE DRAWINGS

In the accompanying drawings, in which one of various possible embodiments of the invention is illustrated, corresponding reference characters refer to corresponding parts throughout the several views of the drawings in which.

DETAILED DESCRIPTION OF AT LEAST ONE PREFERRED EMBODIMENT OF THE INVENTION

Figure 4:
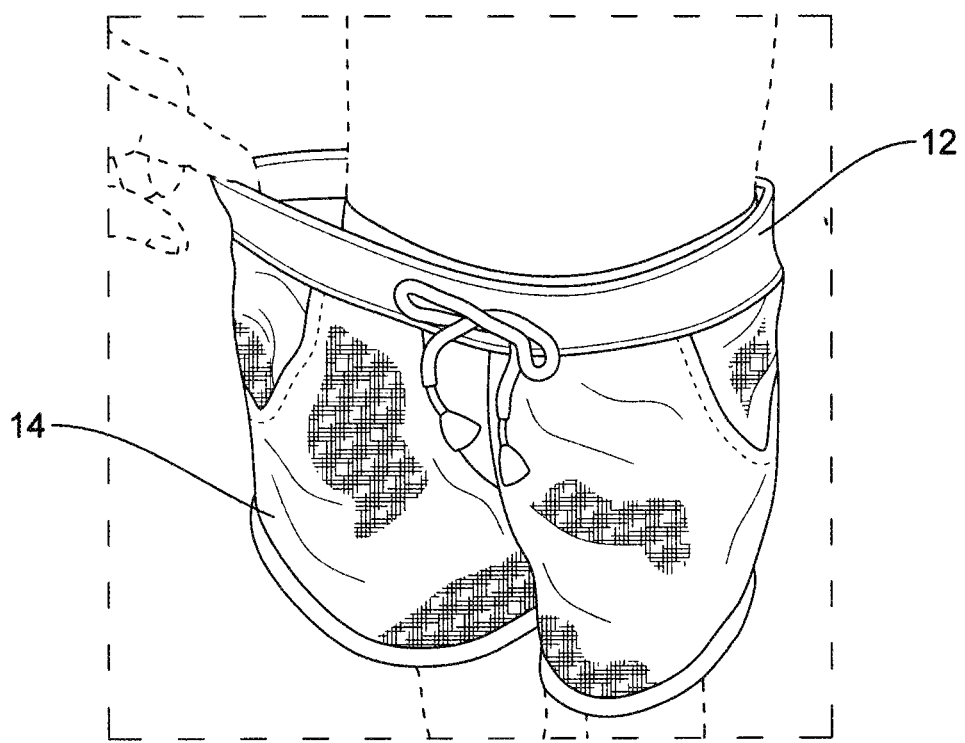
FIG. 4 is a photograph a garment with an oversized waistband.
Figure 5:
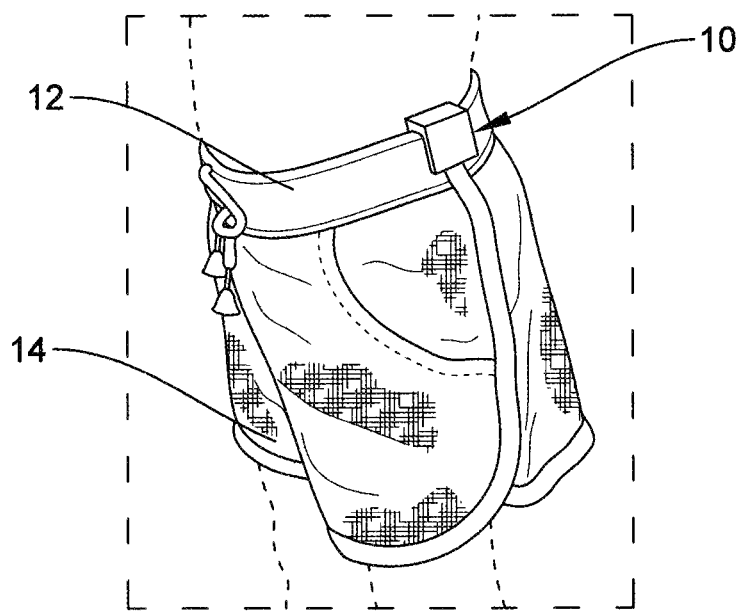
FIG. 5 is a photographs showing the waistband resized with clips on the side seams of the garment.
Figure 6:
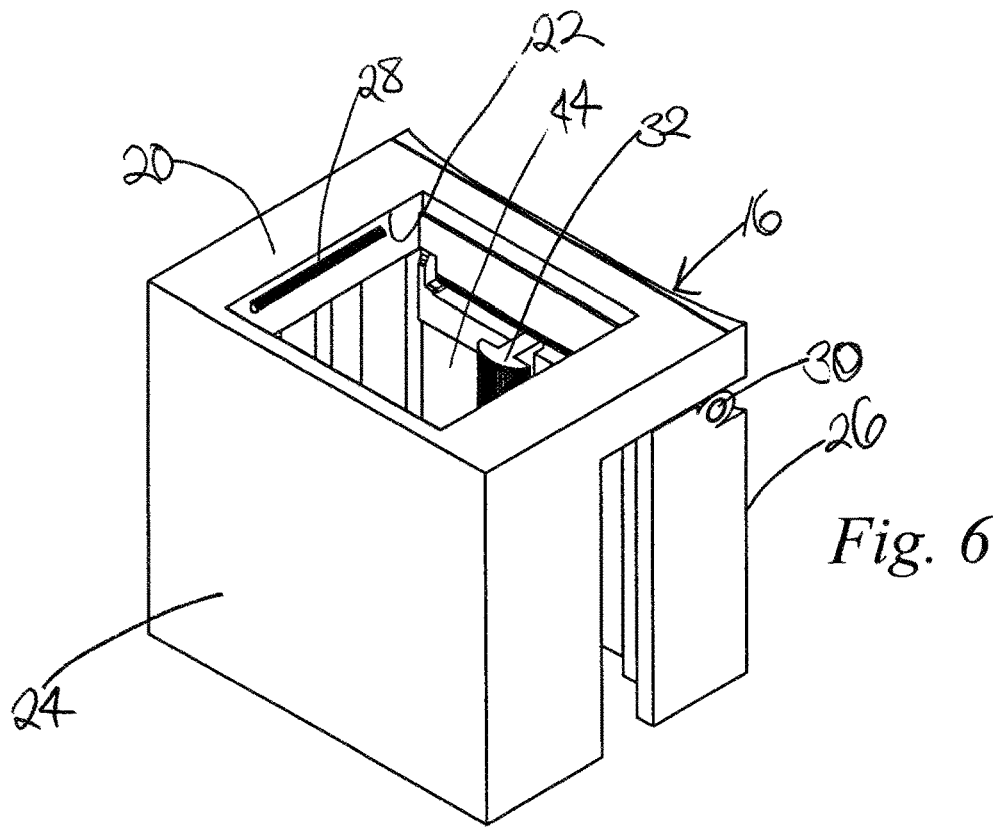
FIG. 6 is a top perspective view of the cover.
Figure 7:
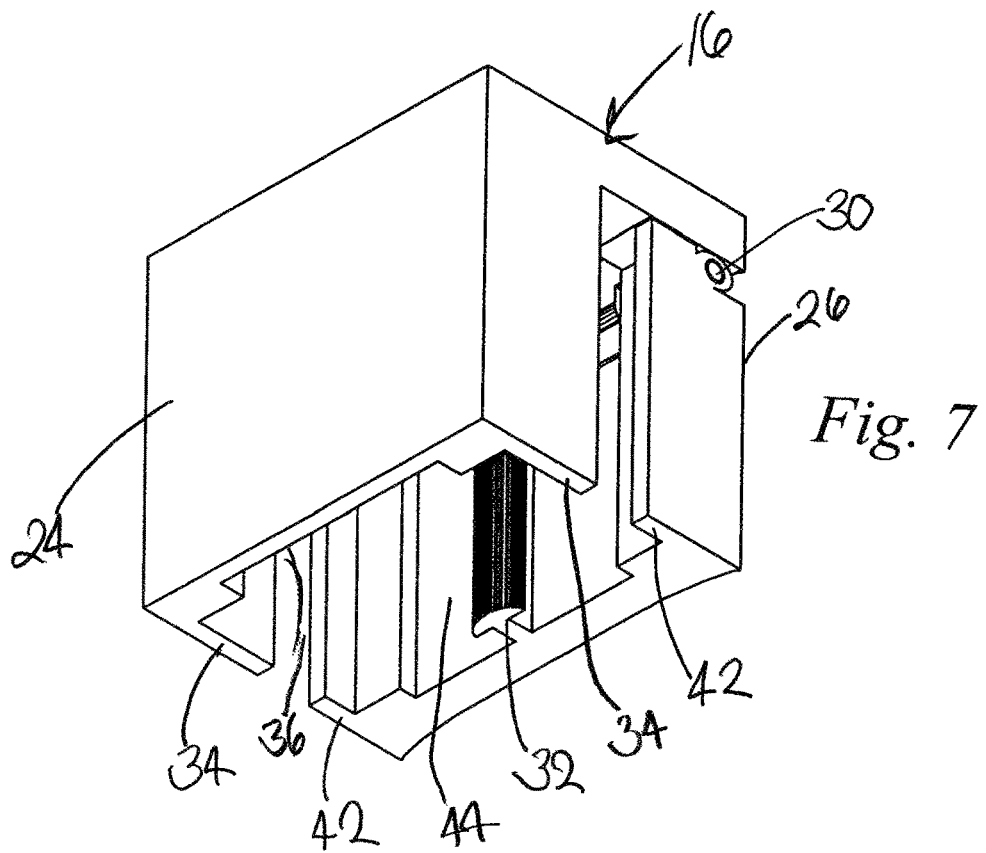
FIG. 7 is a bottom perspective view of the cover.

Referring to the drawings more particularly by reference character, reference numeral 10 refers to a clip in accordance with the present invention. Clip 10 as shown in FIGS. 4 and 5 is for use in tightening a waistband 12 of a garment 14 as more particularly described below.

Figure 8:
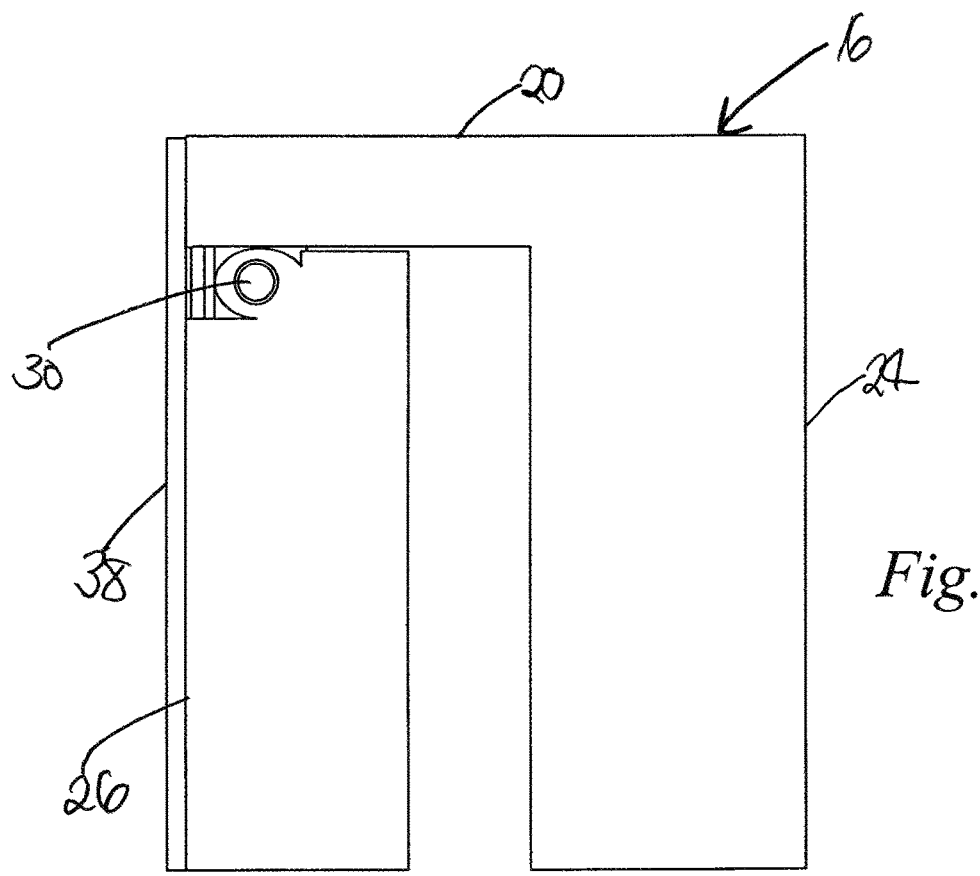
FIG. 8 is a right side view of the cover.
Figure 9:
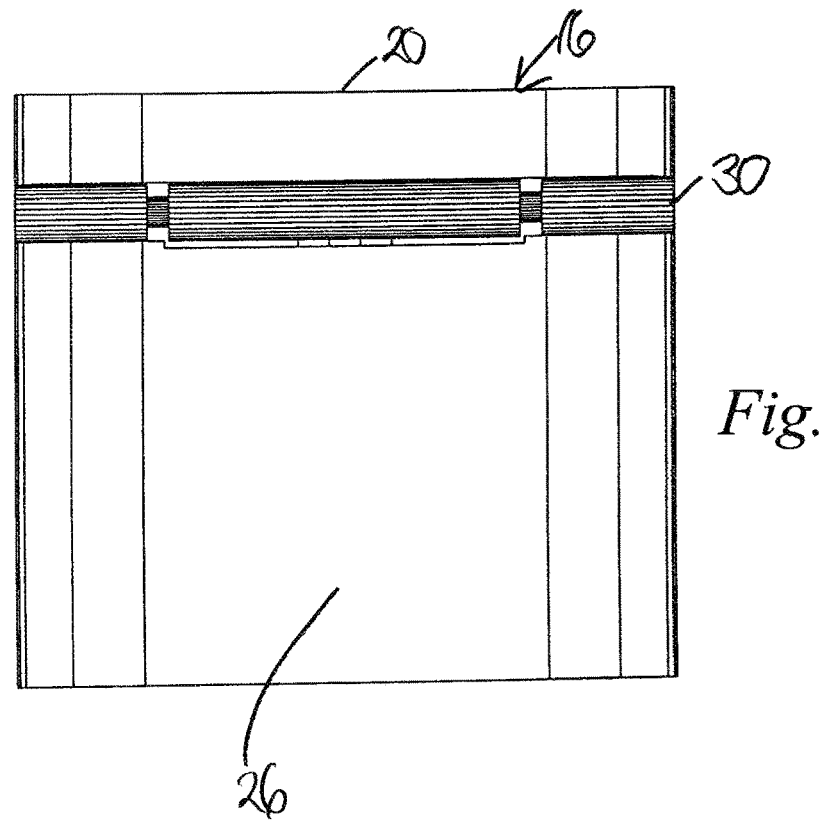
FIG. 9 is a back side view of the cover.
Figure 10:
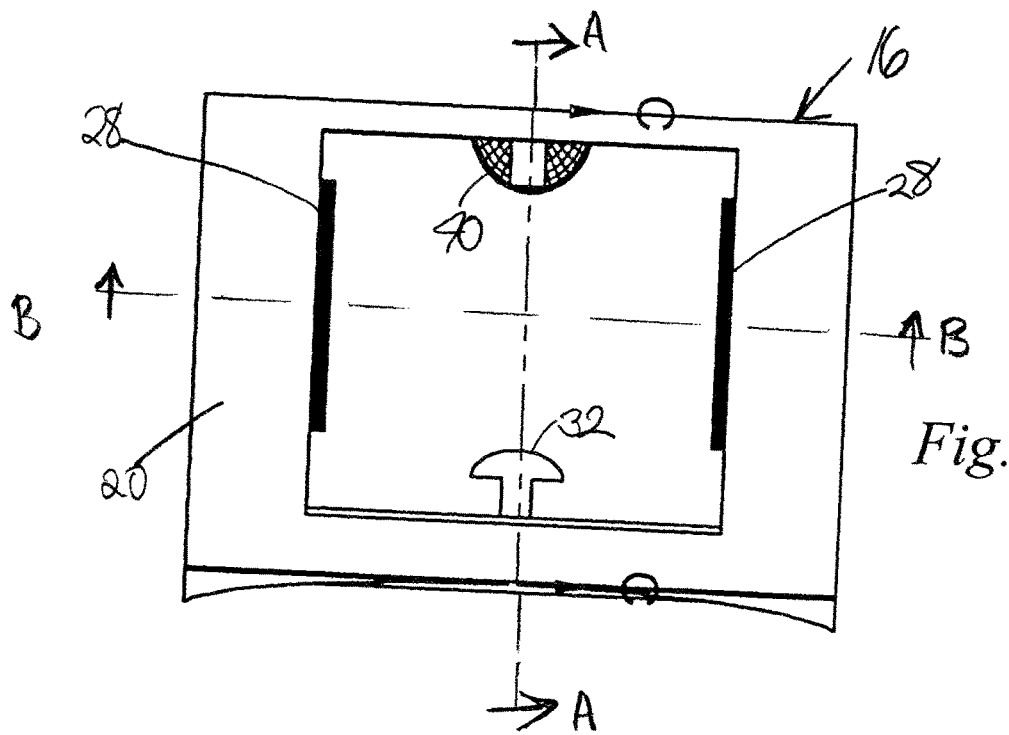
FIG. 10 is a top view of the cover.
Figure 10A:
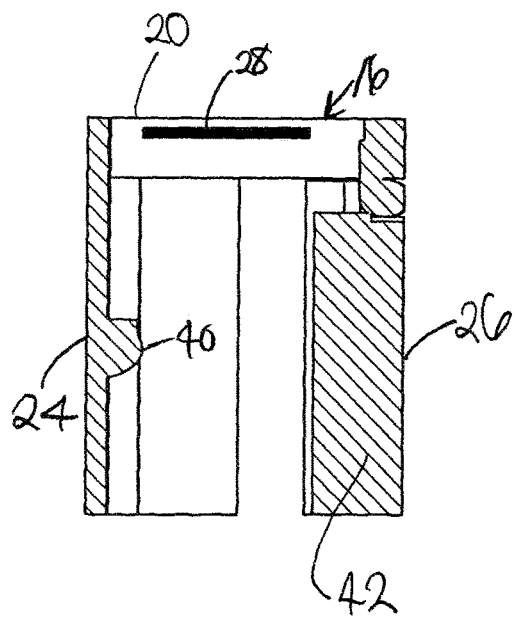
FIG. 10A is a sectional view taken along the plane A-A in FIG. 5.
Figure 10B:
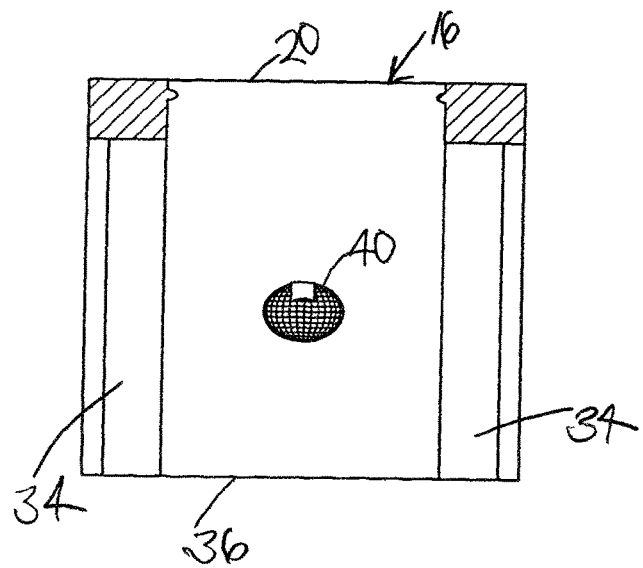
FIG. 10B is a sectional view taken along the plane B-B in FIG. 5.
Figure 11:
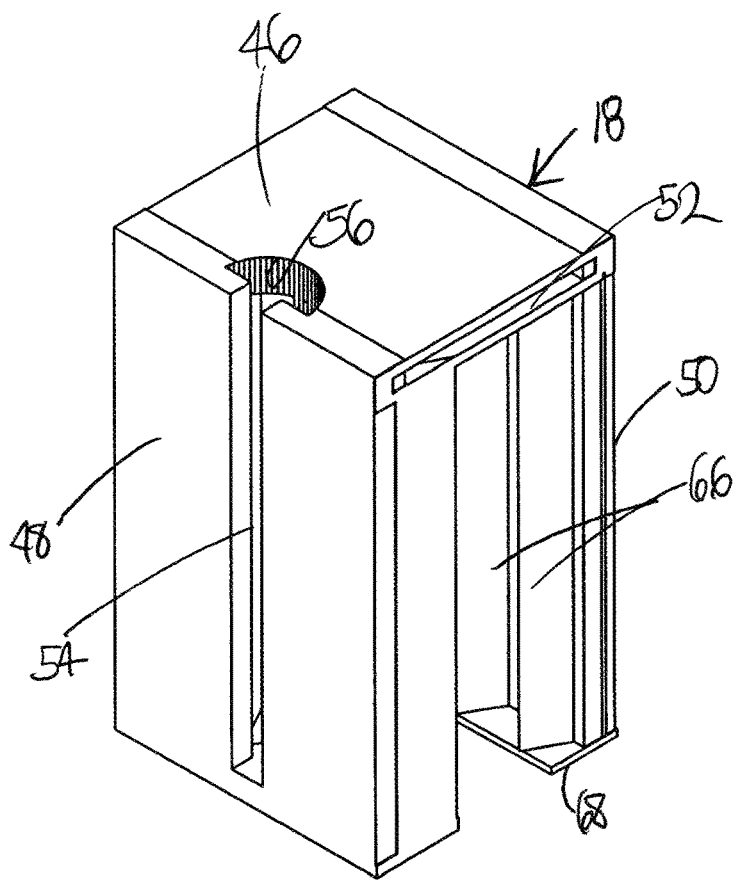
FIG. 11 is a top perspective view of the sinch as viewed from a front.
Figure 12:
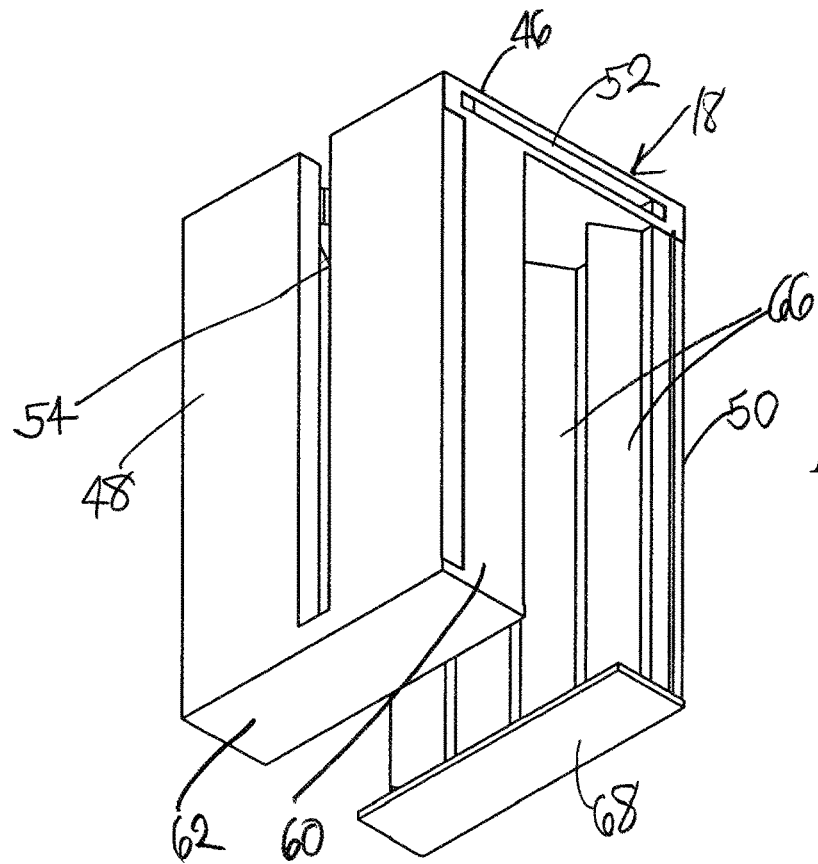
FIG. 12 is a bottom perspective view of the sinch as viewed from the front.
Figure 13:
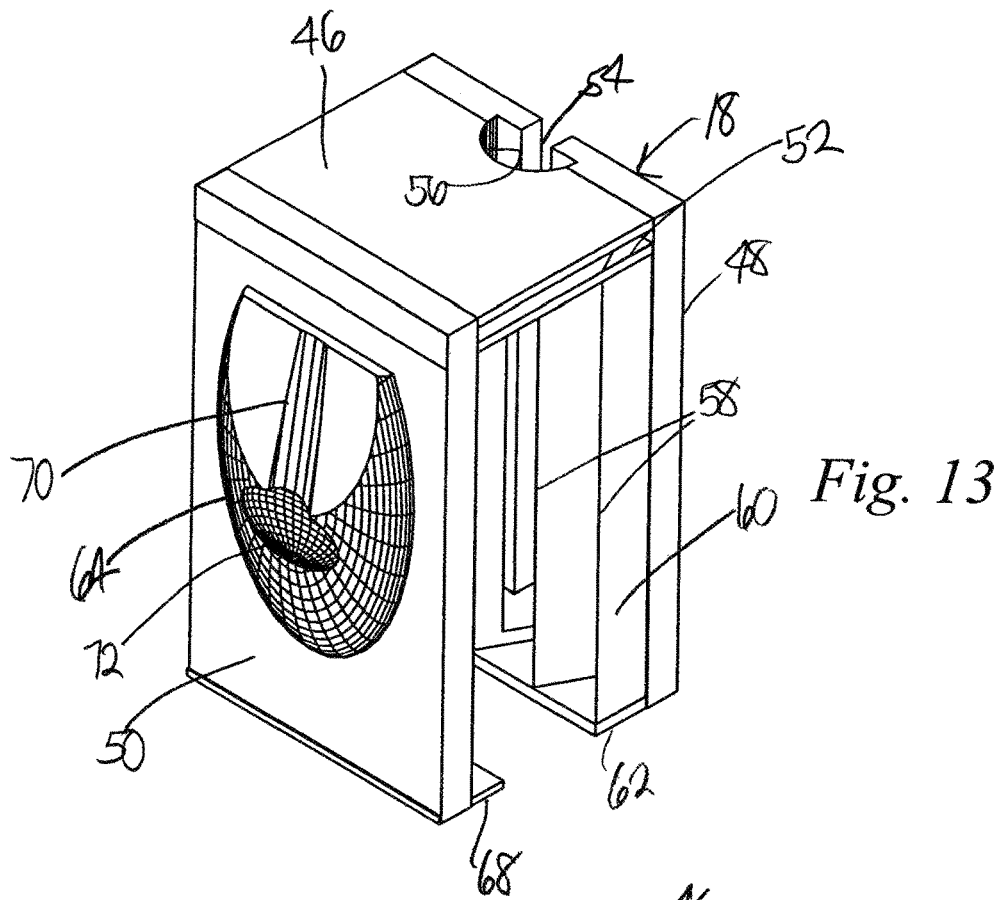
FIG. 13 is a top perspective view of the sinch as viewed from a side.
Figure 14:
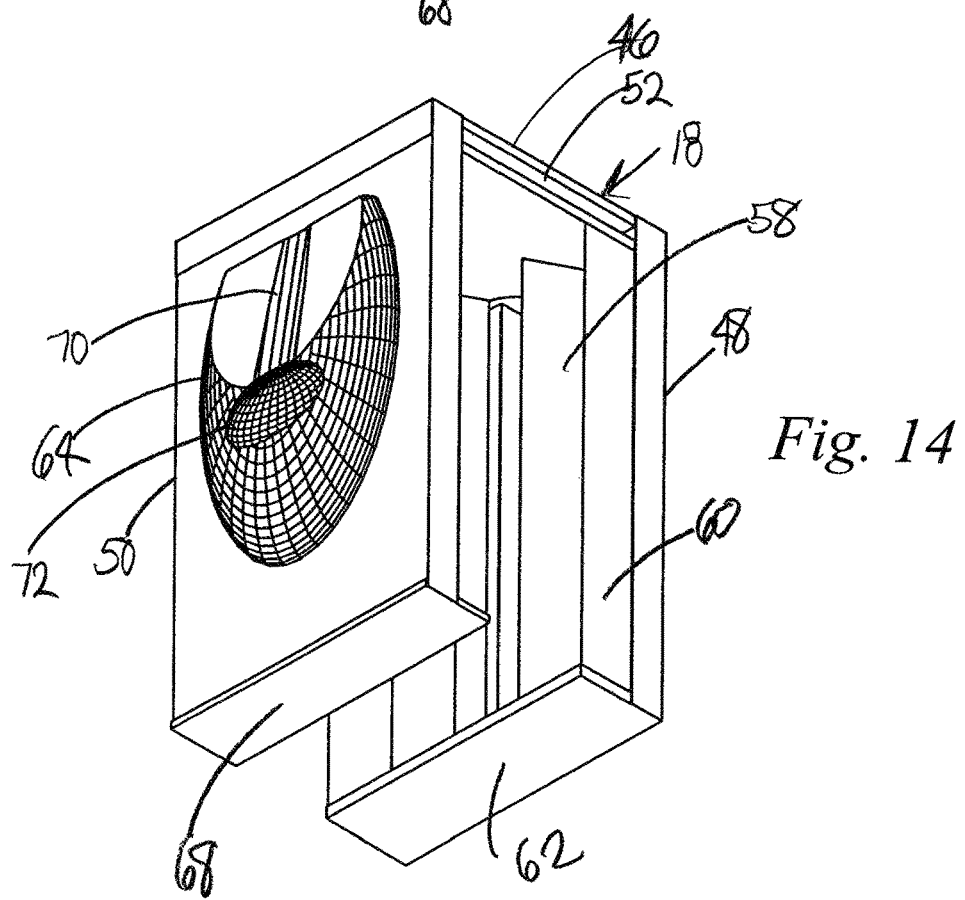
FIG. 14 is a bottom perspective view of the sinch as viewed from the side.

Clip 10 includes a U-shaped cover 16 and a U-shaped sinch 18. As shown in FIGS. 6-10 (including 10A and 10B), cover 16 includes a top wall 20 with an aperture 22 and first and second opposing cover sidewalls 24, 26. A thin abutment ledge 28 is provided on opposite sides of aperture 22, the purpose of which is detailed below. First cover sidewall 24 is hinged 30 to top wall 20 to permit opening and closing of cover 16. As best seen in FIGS. 10, 10A and 10B, first cover sidewall 24 has a longitudinal T-connector 32 which is flanked by L-shaped ridges 34 perpendicular to hinge 30 forming a first channel 36 in which sinch 18 is received. First cover sidewall 24 and cover top wall 20 where it meets with first cover sidewall 24 are curved to allow cover 16 to fit comfortably against the waist of a wearer. For additional comfort a layer of felt 38 or other soft material as shown in FIG. 8 may be provided on the outside of first cover sidewall 24. With continuing reference to FIGS. 10, 10A and 10B second cover sidewall 26 has a protrusion in the form of a ball 40 or the like which is flanked with L-shaped ridges 42 perpendicular to top wall 20 forming a second channel 44 in which sinch 18 is received.

Figure 15:
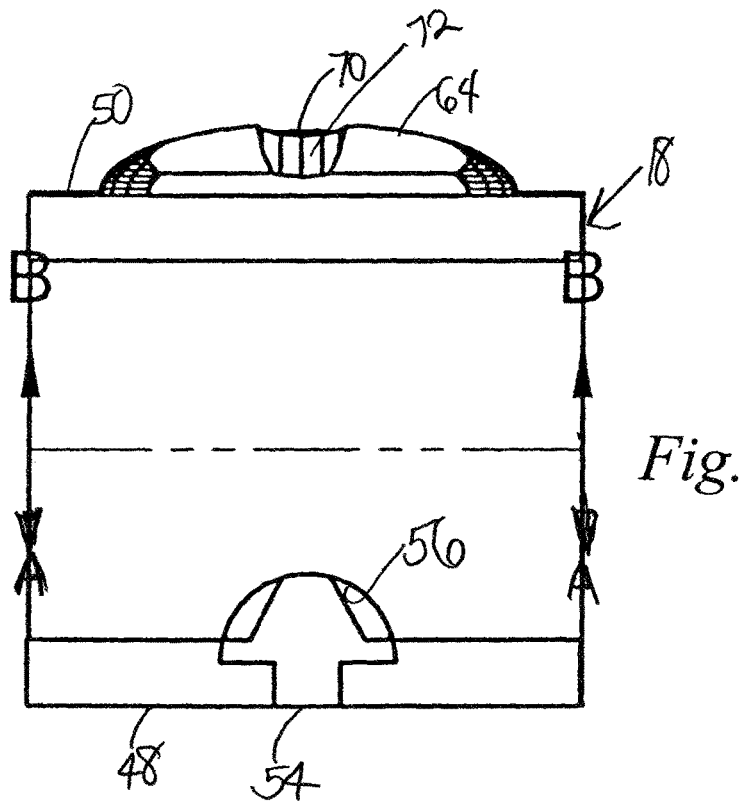
FIG. 15 is a top view of the sinch.
Figure 15A:
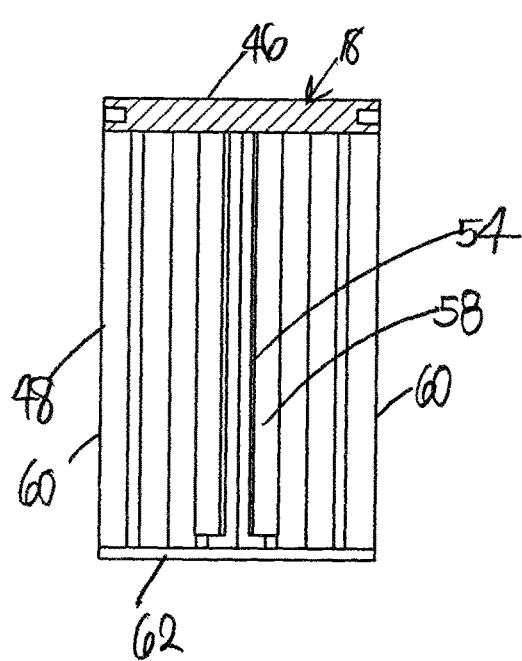
FIG. 15A is a sectional view taken along the plane of A-A in FIG. 10.
Figure 15B:
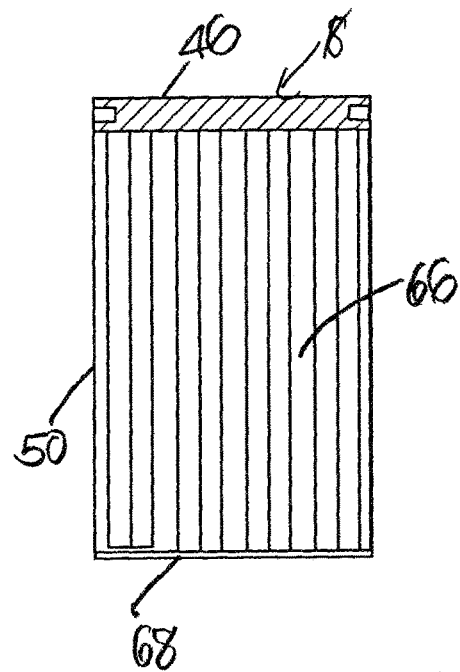
FIG. 15B is a sectional view taken along the plane of B-B in FIG. 10.
Figure 16:
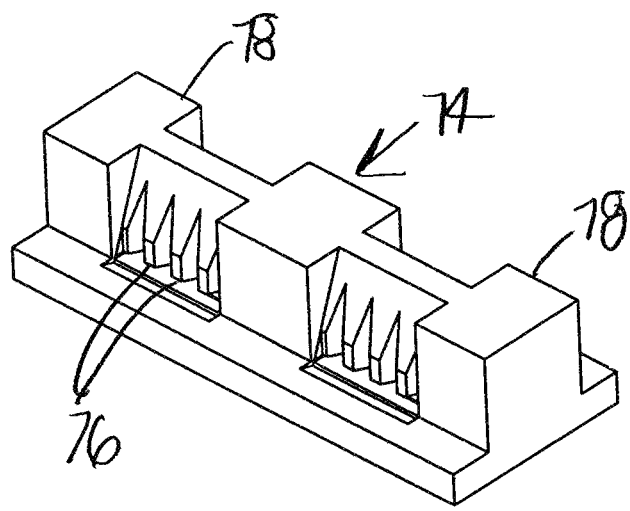
FIG. 16 is a perspective view of a tray viewed from a first side.
Figure 17:
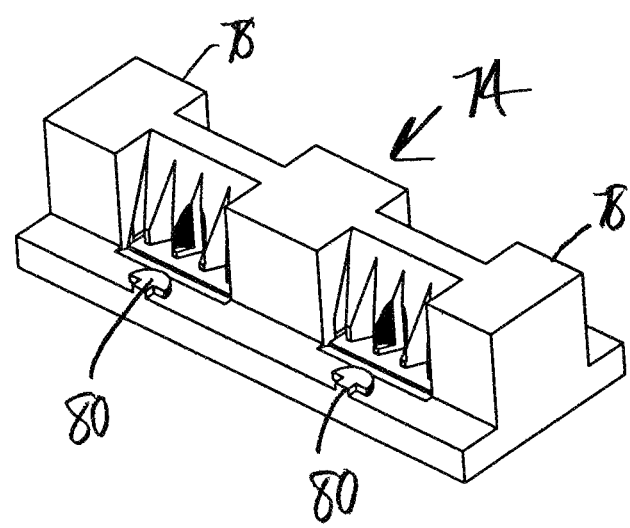
FIG. 17 is a perspective view of the tray viewed from a second side.
Figure 18:
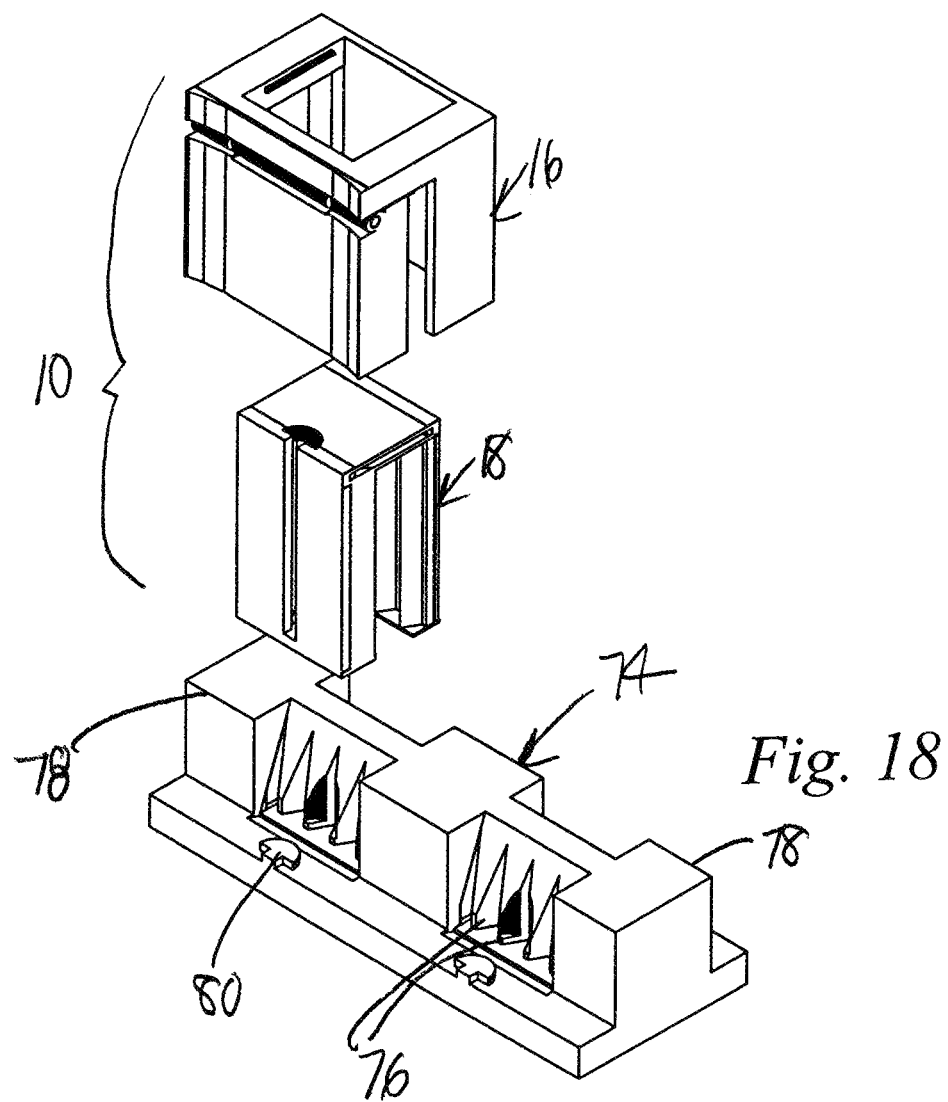
FIG. 18 is an exploded view of a clip being inserted on the tray viewed from the second side.

As shown in FIGS. 11-15 (including 15A and 15B), sinch 18 includes a top wall 46 and first and second opposing sidewalls 48, 50. Sinch top wall 46 is adapted to fit within aperture 22 in cover top wall 20. Indents 52 are provided opposing sides of top wall 46 perpendicular to first and second opposing sidewalls 48, 50 for receipt of the abutment ledges 28 on opposite sides of aperture 22. As best seen in FIGS. 15, 15A and 15B, first sinch sidewall 48 has a longitudinal slot 54 aligned with a T-shaped aperture 56 in top wall 46 for receipt of T-connector 32. A plurality of longitudinal fins 58 perpendicular to top wall 46 flank channel 54. Fins 58 are encased with sidewalls 60 and footed with a bottom wall 62, said sidewalls 60 and bottom wall 62 providing inboard slip-proof edges. With continuing reference to FIGS. 15, 15A and 15B, second sinch sidewall 50 has a dome 64 on the outside and plurality of longitudinal fins 66 footed on a bottom wall 68 on the inside. Dome 64 is sloped downwardly towards sinch top wall 46 forming a pressure wedge with a guideway 70 for directing ball 40 into a well 72 formed at the top of dome 64. Longitudinal fins 58, 66 on first and second sinch sidewalls 48, 50, respectively, are angled in different directions to maximize frictional forces on a folded over section of a waistband 12 and prevent horizontal movement of the fabric in clip 10. First and second sinch sidewalls 48, 50 and fins 58, 66 may be coated with an anti-slip coating to resist both horizontal and vertical movement.

Figure 1:
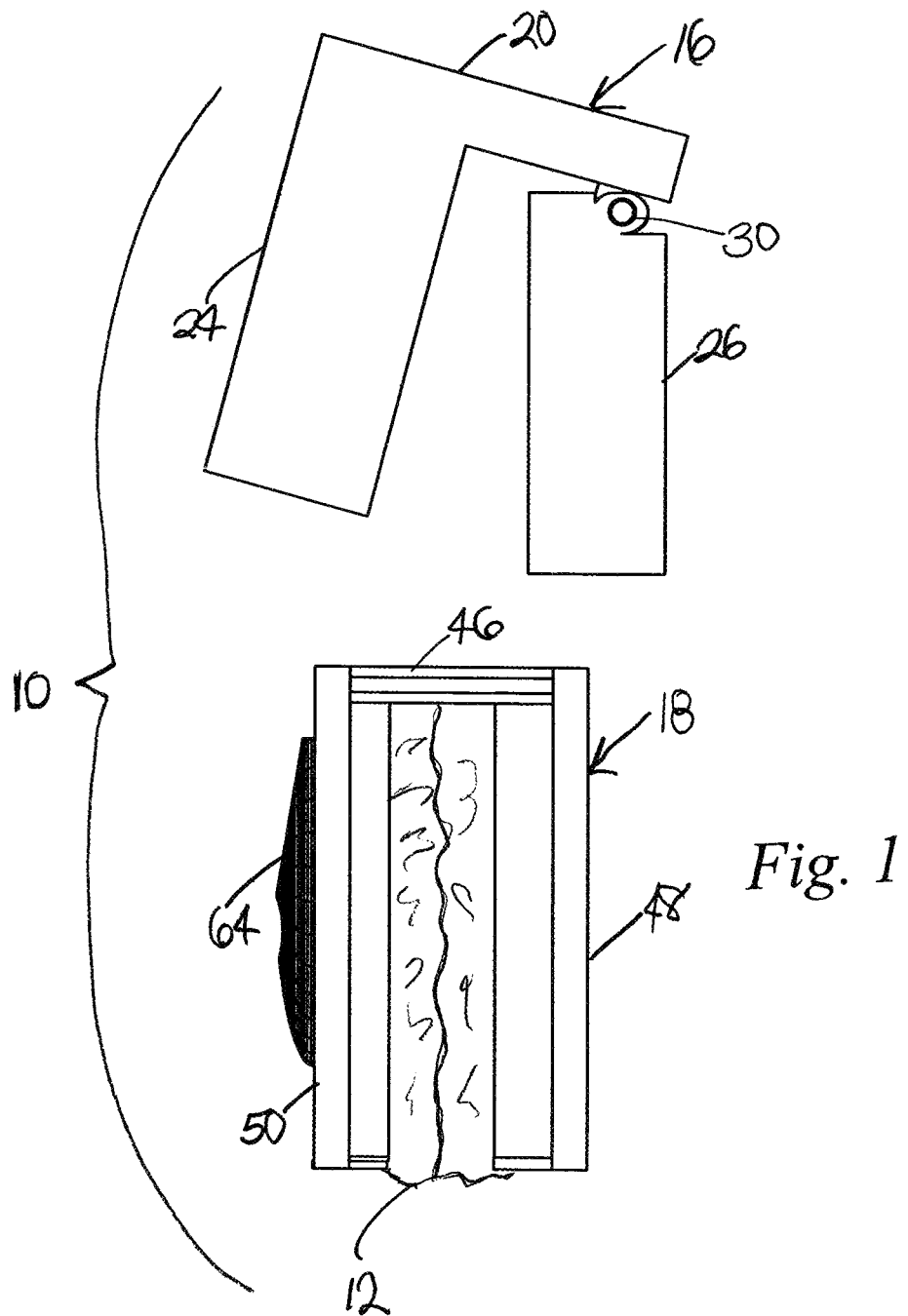
FIG. 1 is an exploded side view of a clip with a sinch inserted on a folded over section of a waist band.
Figure 2:
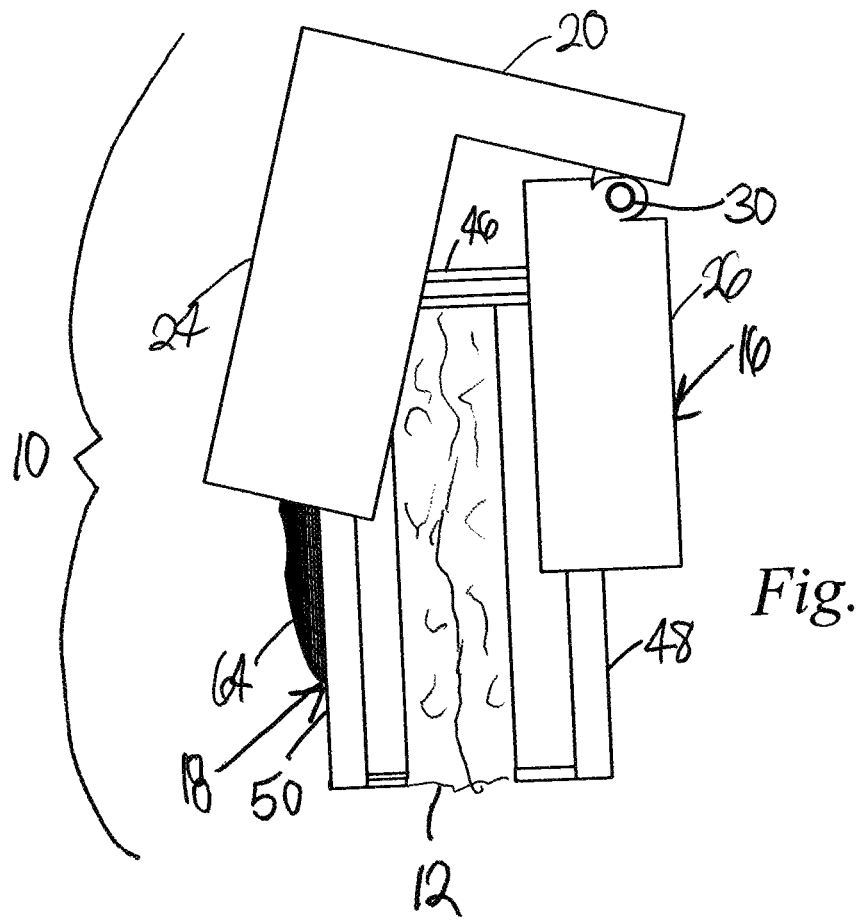
FIG. 2 is a partially assembled clip as shown in FIG. 1 with a cover partially inserted on the sinch.
Figure 3:
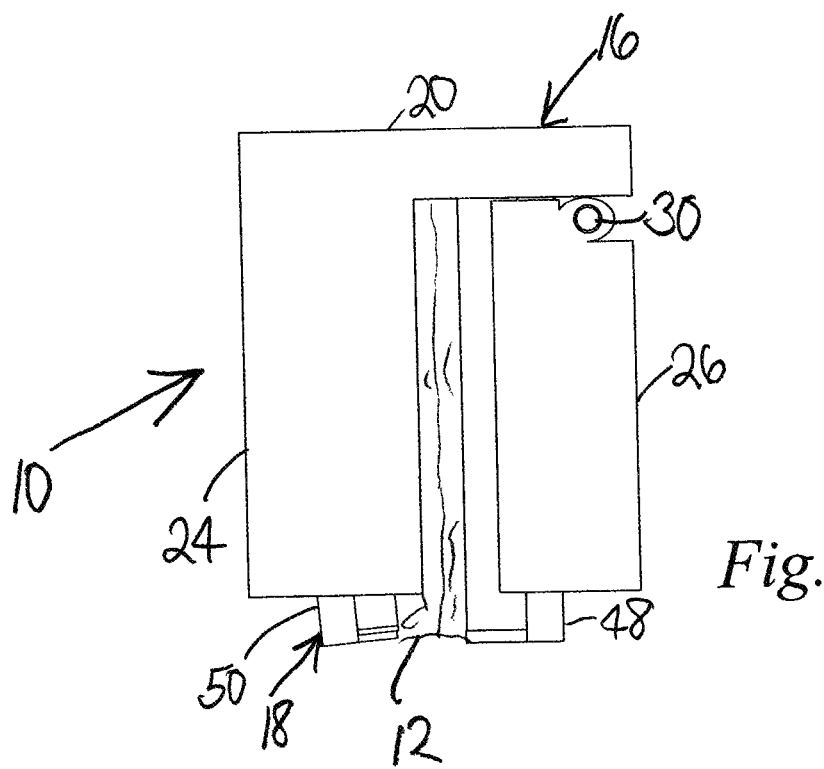
FIG. 3 is an assembled view of the clip with the sinch secured with the cover.

In use as shown in FIGS. 1-3, a section of waistband 12 is folded over and sinch 18 passed over the folded material. A single clip 10 may be installed at the front or back of garment 14 or a pair of clips 10 may be installed along the side seams. Cover 16 is then slipped over sinch 18 with T-shaped aperture 56 in top wall 46 and longitudinal slot 54 aligned with T-connector 32 on first cover sidewall 24 and sinch 18 is received in first channel 36. As T-connector 32 is slid down longitudinal slot 54 and ball 40 is slid up dome 64 in guideway 70 causing second cover sidewall 26 to pivot on hinge 30 into closed position with sinch 18 received in second channel 44, ledges 28 received in indents 52 and ball 40 received in well 72. The fins 58, 66 and the anti-slip coating resist both horizontal and vertical movement of the folded over material in clip 10 while the curved top wall 20 and curved second sidewall 26 with felt 38 make the clip comfortable to wear. As seen in FIG. 3, sinch first and second sidewalls 48, 50 are longer than cover first and second sidewalls 24, 26 so that clip 10 may be easily opened by a wearer by pinching the sinch sidewalls together thereby releasing ball 40 from well 72 and allowing second cover sidewall 26 to pivot and cover 16 to open.

Clips 10 may be provided in different sizes and shapes. Different colors and decorations on the outside of cover 16 are also contemplated. Other variants such as multiple T-connectors 32 and longitudinal slots 54 are also within the scope of the present invention. A tray 74 as shown in FIGS. 14-18 may be provided for storing clips 10 of different colors or with different decorations. As shown, fins 58 of sinch 18 are received on projections 74 between shoulders 78. Cover 16 may then be slipped over sinch 18. Indicia 80 may be provided on tray 74 for indicating the proper orientation of clip 10.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A clip comprising a U-shaped cover having a cover top wall with an aperture and first and second opposing sidewalls, said first cover sidewall hinged to the top wall and having a longitudinal T-connector, said second wall having a protrusion; and,
   a U-shaped sinch adapted to slide inside the U-shaped cover, said U-shaped sinch having a top wall adapted to fit within the aperture in the cover top wall and first and second opposing sidewalls, said first sinch sidewall having a longitudinal slot adapted to slidingly receive the T-connector flanked on an inboard side of the first sinch sidewall by longitudinal fins positioned in a first direction, said second sinch sidewall having a dome with a well on an outboard side of the second sinch sidewall for receipt of the protrusion and longitudinal fins positioned in a second direction on an inboard side.

2. The clip of claim 1 wherein the dome is sloped downwardly toward the sinch top wall with a guideway for directing the protrusion into the well.

3. The clip of claim 1 wherein the longitudinal fins on the first and second sinch sidewalls and the inboard side of the first and second sinch sidewalls are coated with an anti-slip coating.

4. The clip of claim 1 wherein the cover top wall and the first cover sidewall are curved on an outboard side to fit against a waist of a user.

5. The clip of claim 4 wherein the first cover sidewall is padded on the outboard side.

6. A clip comprising
a U-shaped cover having a cover top wall with an aperture and first and second opposing sidewalls, said first cover sidewall hinged to the top wall and having a longitudinal T-connector, said second wall having a protrusion; and,
a U-shaped sinch adapted to slide inside the U-shaped cover, said U-shaped sinch having a top wall adapted to fit within the aperture in the cover top wall and first and second opposing sidewalls, said first sinch sidewall having a longitudinal slot adapted to slidingly receive the T-connector, said second sinch sidewall having a dome with a well on an outboard side of the second sinch sidewall for receipt of the protrusion.

7. The clip of claim 6 wherein the dome is sloped downwardly toward the sinch top wall with a guideway for directing the protrusion into the well.

8. The clip of claim 6 wherein the aperture in the cover top wall has abutment ledges and the sinch top wall has detents adapted to receive the abutment ledges.

9. The clip of claim 6 wherein the first cover sidewall has L-shaped side ridges on an inboard side of the first cover sidewall forming a first channel and the second cover sidewall has L-shaped side ridges on an inboard side of the second cover sidewall forming a second channel for receipt of the sinch.

10. The clip of claim 6 wherein the cover top wall and the first cover sidewall are curved to fit against a waist of a user.

11. The clip of claim 10 wherein the first cover sidewall is padded on an outboard side of the first cover sidewall.

12. A clip comprising
a U-shaped cover having a cover top wall with an aperture and first and second opposing sidewalls, said first cover sidewall hinged to the top wall and having a longitudinal T-connector, said second wall having a protrusion; and,
a U-shaped sinch adapted to slide inside the U-shaped cover, said U-shaped sinch having a top wall adapted to fit within the aperture in the cover top wall and first and second opposing sidewalls, said first sinch sidewall having a longitudinal slot adapted to slidingly receive the T-connector flanked on an inboard side of the first sinch sidewall by longitudinal fins positioned in a first direction, said second sinch sidewall having a well an outboard side of the second sinch sidewall for receipt of the protrusion and longitudinal fins positioned in a second direction on an inboard side of the second sinch sidewall.

13. The clip of claim 12 wherein the fins on the first sinch sidewall are encased in sidewalls and footed with a bottom wall and wherein the fins on the second sinch sidewall are footed with a bottom wall, said bottom wall on the first sinch sidewall opposing said bottom wall on the second sinch sidewall.

14. The clip of claim 13 wherein the longitudinal fins on the first and second sinch sidewalls and the inboard side of the first and second sinch sidewalls are coated with an anti-slip coating.

15. The clip of claim 12 wherein the first and second sidewalls of the sinch are longer than the first and second sidewalls of the cover such that the first and second sidewalls of the sinch may be pinched together to release the sinch from the cover.

\* \* \* \* \*